United States Patent
Repellin

(10) Patent No.: US 10,067,751 B2
(45) Date of Patent: Sep. 4, 2018

(54) METHOD OF DIAGNOSING AND/OR UPDATING OF SOFTWARE OF AN ELECTRONIC DEVICE EQUIPPED WITH AN HDMI TYPE CONNECTOR AND ASSOCIATED DEVICE

(75) Inventor: Olivier Repellin, Rueil-Malmaison (FR)

(73) Assignee: SAGEMCOM BROADBAND SAS, Rueil-Malmaison (FR)

( * ) Notice: Subject to any disclaimer, the term of this patent is extended or adjusted under 35 U.S.C. 154(b) by 1572 days.

(21) Appl. No.: 13/203,557

(22) PCT Filed: Feb. 5, 2010

(86) PCT No.: PCT/FR2010/050193
§ 371 (c)(1),
(2), (4) Date: Sep. 20, 2011

(87) PCT Pub. No.: WO2010/097533
PCT Pub. Date: Sep. 2, 2010

(65) Prior Publication Data
US 2012/0005665 A1    Jan. 5, 2012

(30) Foreign Application Priority Data
Feb. 27, 2009   (FR) .................................... 09 51286

(51) Int. Cl.
*G06F 3/00* (2006.01)
*G06F 13/00* (2006.01)
(Continued)

(52) U.S. Cl.
CPC . *G06F 8/61* (2013.01); *G06F 8/65* (2013.01)

(58) Field of Classification Search
USPC ........ 710/14, 100, 106, 2, 8, 26, 31, 33, 38, 710/62; 725/132–133
See application file for complete search history.

(56) References Cited

U.S. PATENT DOCUMENTS 6,124,938 A     9/2000  Rabb et al.
8,190,786 B2 *  5/2012  Nakahama ........................ 710/8
(Continued)

FOREIGN PATENT DOCUMENTS

EP    0 201 001 B1    3/1993
EP    1 519 304 B1    8/2010

OTHER PUBLICATIONS

International Search Report as issued for PCT/FR2010/050193.

*Primary Examiner* — Idriss N Alrobaye
*Assistant Examiner* — Henry W Yu
(74) *Attorney, Agent, or Firm* — Pillsbury Winthrop Shaw Pittman LLP

(57) ABSTRACT

A method of diagnosing and/or updating software, associated with a processor within a first electronic device equipped with an HDMI type connector, includes: linking, using a suitable cable, a third-party electronic device, configured to perform a diagnosing or updating operation, or both, of the embedded software, with a first pin and a second pin of the HDMI connector; carrying out an operation of switching the first electronic device, by toggling the first electronic device from a first mode to a second mode in which the HDMI connector is configured, via the first pin and the second pin, to exchange information to and from the processor; carrying out, via the suitable cable, exchanges of information between the first electronic device and the third-party electronic device, so as to carry out the operation of diagnosing and/or updating of the embedded software.

9 Claims, 2 Drawing Sheets

(51) Int. Cl.
    *G06F 5/00*     (2006.01)
    *G06F 13/12*     (2006.01)
    *G06F 13/42*     (2006.01)
    *G06F 8/61*     (2018.01)
    *G06F 8/65*     (2018.01)

(56) References Cited

U.S. PATENT DOCUMENTS

| | | |
|---|---|---|
| 2005/0120384 A1* | 6/2005 | Stone et al. ............... 725/132 |
| 2005/0182876 A1* | 8/2005 | Kim et al. ............... 710/100 |
| 2006/0200813 A1 | 9/2006 | Young et al. |
| 2006/0211328 A1 | 9/2006 | del Castillo |
| 2007/0056011 A1* | 3/2007 | Kwon et al. ............... 725/133 |
| 2007/0233906 A1* | 10/2007 | Tatum et al. ............... 710/26 |
| 2009/0144455 A1* | 6/2009 | Chen ............... 710/8 |
| 2009/0177820 A1* | 7/2009 | Ranade et al. ............... 710/106 |

* cited by examiner

METHOD OF DIAGNOSING AND/OR UPDATING OF SOFTWARE OF AN ELECTRONIC DEVICE EQUIPPED WITH AN HDMI TYPE CONNECTOR AND ASSOCIATED DEVICE

CROSS REFERENCE TO RELATED APPLICATIONS

This application is the U.S. National Stage of PCT/FR2010/050193, filed Feb. 5, 2010, which in turn claims priority to French Patent Application No. 0951286, filed Feb. 27, 2009, the entire contents of all applications are incorporated herein by reference in their entireties.

TECHNICAL FIELD OF THE INVENTION

The object of the present invention is a method of diagnosing and/or updating of software installed in an electronic device, said electronic device being equipped with at least one connector of the HDMI connector type. The invention also relates to any electronic device capable of implementing the method according to the invention. The main object of the invention is to make updating and diagnosing operations of software embedded in electronic devices presenting audio-video interfaces possible.

The field of the invention is, in general, that of electronic devices capable of transmitting audio/video content. The expression "transmission of audio/video content" generally relates to the transmission of data relative to images and/or sounds intended to be reproduced by means of a third-party electronic apparatus, for example a television screen. In the following description, an electronic device of the digital television decoder type will be considered by way of example only.

Currently, digital television decoders are likely to have several communication ports to exchange various information with third-party devices. These communication ports may, for example, be serial ports (of the RS232 type), USB ports, Ethernet ports or even jack socket connectors. These communication ports also may be utilized in production and/or maintenance phases to exchange various information with the decoder. In particular, these ports are utilized to carry out diagnosing operations on the software installed within the decoder, or updating operations of this same software. The software under consideration is constituted of all of the applications enabling various operations associated with the functioning of the electronic device under consideration. In the case of a decoder, the software particularly manages operations controlling the rights of access to different television services, operations to decode said services, specific operations of the menu management type, etc.

TECHNOLOGICAL BACKGROUND OF THE INVENTION

However the RS232 and jack socket communication ports that have just been mentioned tend to disappear in new electronic devices capable of transmitting video content. The USB port is absent on electronic devices for which one seeks to limit production costs. On the other hand, on all these electronic devices, including inexpensive electronic devices, a connector of the HDMI connector type is increasingly available.

An HDMI (High Definition Multimedia Interface) connector is a connector enabling the implementation of an entirely digital audio/video interface, which is usually used to transmit uncompressed flows. HDMI interfaces enable an audio/video source from an electronic device—such as a Blu-Ray reader—or a computer or game console—to be connected, with a compatible receiver—such as for example a High Definition television. The universality of HDMI connectors mainly comes from the fact that they implement interfaces supporting any high definition television video format, including standard definition, improved definition and high definition, as well as multichannel sound, all by means of a single cable. HDMI connectors are independent from different digital television transmission standards, whether terrestrial digital television or satellite digital television, cable digital television, etc.

An example of an HDMI type connector is illustrated in FIG. 1. In this figure, an HDMI connector 100 is represented; this is a type A connector, which is the most common HDMI connector. Type B and type C connectors also exist, the implementation of the object of the invention being possible with any HDMI type connector.

Connector 100 is a female plug comprising 19 pins, referenced 1 to 19, whose function is standardized.

Thus, pins 1 to 9 are pins known as TMDS (Transition Minimized Differential Signaling), enabling the serial transmission of high-speed data through a shielded cable. Each HDMI connector comprises three distinct TMDS channels, each channel involving three pins. Pins 10, 11 and 12 are pins enabling the implementation of a TMDS clock channel, in order to carry out temporalization of the data flows circulating by the TMDS pins, and to thus ensure the integrity of the data transmitted, even over long cables.

Pin 13 is a pin known as CEC (Consumer Electronics Control). This pin is used optionally. It enables more functionality to be added to an audio/video system. In addition, it allows for example an electronic device to communicate with another and to control it: For example, by pressing on a single key called the "universal reading" key on a remote control, a user may activate all the electronic devices necessary for reading a content, the control information circulating by the CEC pins of the different intervening devices.

Pin 14 is a pin that is not used to date in the different existing versions of HDMI protocol. It is designated as a reserved pin.

Pins 15 and 16 are respectively pins known as SCL and SDA pins.

Pin 17 is a pin known as DDC Channel, also called display data channel pin. In particular, the pin enables a transmitter, for example a graphics card, to query a recipient, for example a high-definition television equipped with an HDMI connector 100, on its display capabilities.

Pin 18 is a power pin, brought to the +5 Volts voltage.

Pin 19 is a pin known as HPD, that enables quick plug detection; This pin plays an essential role in detecting apparatuses that are compatible with HDMI standards.

HDMI connectors of the type that have just been described with reference to FIG. 1 are thus intended to be present on all electronic devices intended for video displays. They do not, however, exchange information relative to the diagnosing or updating of software embedded in the device that they equip with a third-party electronic device. Thus, no solution exists to date to carry out diagnosing or updating operations of software embedded within an electronic device equipped with an HDMI connector, that does not have other connectors enabling such operations.

GENERAL DESCRIPTION OF THE INVENTION

The method and device according to the invention propose a solution to the problem that has just been stated. The invention proposes a solution to make possible, through a single HDMI connector, an exchange of information to carry out diagnosing and/or updating operations of software embedded in an electronic device capable of reproducing audio and/or video signals. The information exchange takes place between the device equipped with an HDMI connector and a third-party electronic device capable of diagnosing and/or updating the embedded software. For this purpose, the invention provides, in particular, switching of certain links, or lines, connecting the HDMI connector to a microcontroller of the electronic device equipped with embedded software.

The invention thus mainly relates to a method of diagnosing and/or updating embedded software, associated with a processor within a first electronic device equipped with an HDMI type connector, characterized in that said method comprises the different steps consisting of:

linking, by means of a suitable cable, a third-party electronic device, able to perform a diagnosing or updating operation of the embedded software, with a first pin and a second pin of the HDMI connector;

carrying out an operation of switching the first electronic device, by toggling said first electronic device from a first mode, known as the usual operating mode, to a second mode, known as the transmission mode, in which the HDMI connector is able, via the first pin and the second pin, to exchange information to and from the processor; said switching operation comprising different operations consisting of toggling a first connection, linking in the usual operating mode a first processor port, dedicated to the receipt of data, to a serial port from the first electronic device or to an unused port, such that said first connection links, in the transmission mode, said first port of the processor to said first pin of the HDMI connector;

toggling a second connection, linking in the usual operating mode a second processor port, dedicated to the transmission of data, to a serial port from the first electronic device or to an unused port, such that said second connection links, in the transmission mode, said second port of the processor to said second pin of the HDMI connector.

carrying out, via the suitable cable, exchanges of information between the first electronic device and the third-party electronic device, so as to carry out the operation of diagnosing and/or updating of the embedded software.

The method according to the invention may comprise, in addition to the main characteristics that have just been mentioned in the previous paragraph, one or more additional characteristics from among the following:

the first pin of the HDMI connector is the pin known as the CEC pin, and in that the second pin of the HDMI connector is the pin known as the reserved pin.

the switching operation is carried out following the receipt by the first electronic device of a specific command, particularly a command transmitted by means of a remote control associated with said first device, or a command corresponding to pressing on a key, or on a combination of keys, present on said first device.

the method comprises the additional step consisting of carrying out an operation of switching the first electronic device by toggling it from the transmission mode to the usual operating mode following the receipt, during the diagnosing or updating operation of the embedded software, of a specific command transmitted by the third-party electronic device via the suitable cable.

The different additional characteristics of the method according to the invention, insofar as they are not mutually exclusive, are combined according to all combination possibilities to result in different examples of embodiment of the invention.

The present invention also refers to an electronic device equipped with an HDMI type connector able to implement the method according to the invention, said device comprising embedded software associated with a processor, said embedded software being the subject of a diagnosing and/or updating operation, characterized in that said device comprises a switching means to carry out:

toggling a first connection, linking in a first mode of operation, known as the usual operating mode, a first processor port, dedicated to the receipt of data, to a serial port or to an unused port of said electronic device, such that said first connection links, in a second mode of operation, known as the transmission mode, said first port of the processor to a first pin of the HDMI connector;

toggling a second connection, linking in the usual operating mode a second processor port, dedicated to the transmission of data, to a serial port or to an unused port from said first electronic device, such that said second connection links, in the transmission mode, said second port of the processor to said second pin of the HDMI connector.

The device according to the invention may comprise, in addition to the main characteristics that have just been mentioned in the previous paragraph, the additional characteristic according to which in the transmission mode, the first processor port is connected to the pin of the HDMI connector known as the CEC pin, and in the transmission mode, the second processor port is connected to the pin of the HDMI connector known as the reserved pin.

The invention and its various applications will be better understood upon reading the following description and examining the accompanying figures.

BRIEF DESCRIPTION OF THE FIGURES

The figures are only presented for indicative purposes and in no way limit the scope of the object of the present invention. The figures show.

DESCRIPTION OF PREFERRED FORMS OF EMBODIMENT OF THE INVENTION

Unless stated otherwise, different elements appearing in different figures will keep the same references.

Figure 1:
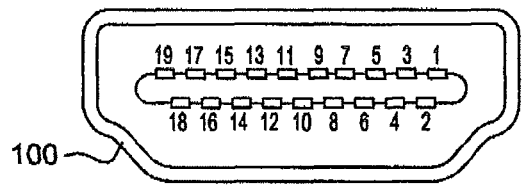
in FIG. 1, already described, a representation of a type A female HDMI connector.
Figure 2:
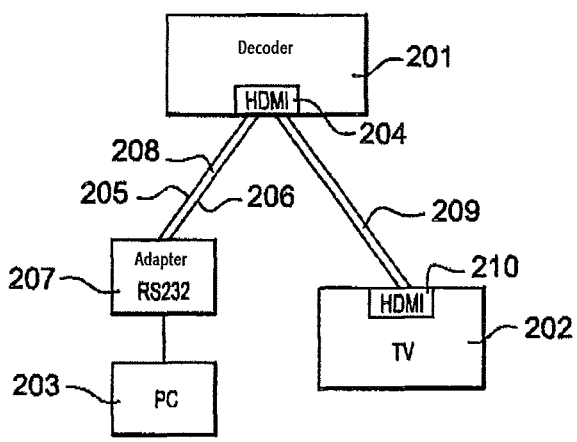
in FIG. 2, a schematic representation of the different material elements intervening in an example of embodiment of the method according to the invention.

FIG. 2 represents an electronic device 201 according to the invention, in this example of the digital television type, which exchanges information with a television 202 and a third-party electronic device 203, of the personal computer type; the different information is issued from decoder 201 by an HDMI connector 204 of the type represented in FIG. 1. According to the invention, in order to carry out diagnosing and/or updating operations of software embedded in decoder 201, a first connection 205, respectively a second connection 206, links a first pin, respectively a second pin, to the personal computer through an intermediate equipment of the RS232 adapter type, enabling the interface to be made between the two connections 205 and 206 and an RS232 type serial connector from the personal computer 203. The first connection 205 and second connection 206 constitute a suitable cable 208 enabling an exchange of information between decoder 201 and personal computer 203 for updating and/or diagnosing operations of the software embedded in decoder 201.

In HDMI connector 204, the pins, other than the pins connected by connections 205 and 206 to adapter 207, are connected by a transmission cable 209 to the pins of a second HDMI connector 210 present at the level of the television 202. By judiciously choosing the first pin and the second pin, as will be detailed in the continuation of the description, the transmission cable 209 enables a usual operation of television 202 receiving signals from decoder 201, while carrying out diagnosing and/or updating operations of the embedded software of decoder 201. Once the diagnosing and/or updating operations of said software are completed, cables 208 and 209 may be replaced by a single cable usually used to connect decoder 201 to television 202 through HDMI connectors.

Figure 3:
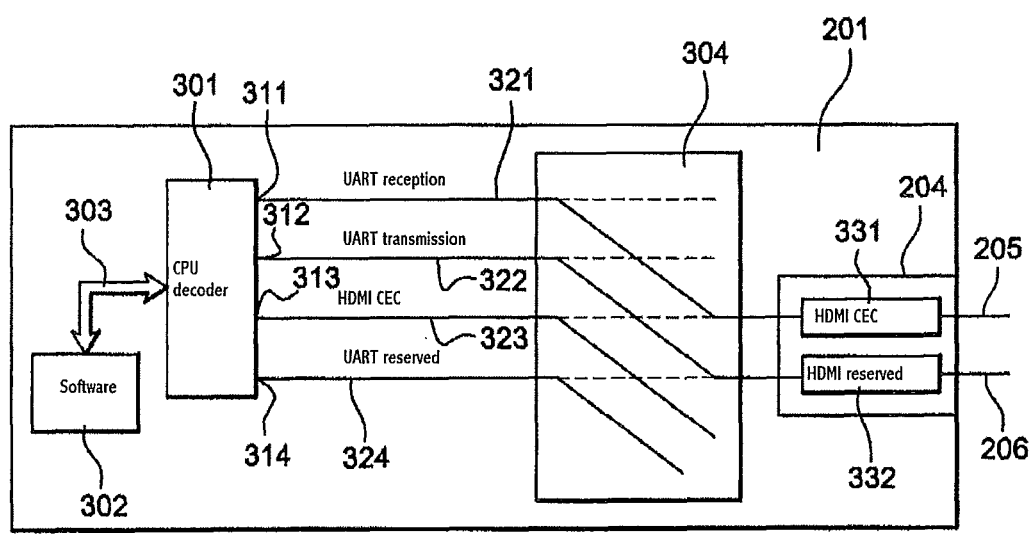
in FIG. 3, an internal electronic diagram of a device according to the invention.

FIG. 3 illustrates an example of embodiment of the method according to the invention. This figure schematically represents, within decoder 201, a processor 301 associated with embedded software 302. Processor 201 exchanges information with embedded software 302 via a bidirectional communication bus 303.

In the invention, decoder 201 is able to pass from a first mode, known as the usual operating mode, to a second mode, known as the transmission mode, and vice-versa.

In this usual operating mode, the different processor ports 301 are assigned according to a usual operation from the prior art. Thus, in the usual operating mode, a first port 311 of processor 301 dedicated to the receipt of data, is connected, by a first connection 321, to a dedicated port of a serial connector, not represented, for example of the RS232 type. In the usual operating mode, a second port 312 of processor 301 dedicated to the transmission of data, is connected, by a second connection 322, to a dedicated port of a serial connector, not represented, for example of the RS232 type. In the case of low-end decoders that do not have serial connectors, the first connection 321 and the second connection 322 are connected to unused ports.

In transmission mode, the first port 311 of processor 301 dedicated to the receipt of data is connected, by the first connection 321, to a first connection pin 321 of the HDMI connector 204. In transmission mode, the second port 312 of processor 301 dedicated to the transmission of data is connected, by the second connection 322, to a second connection pin 322 of the HDMI connector 204. Advantageously, port 311 is a UART (Universal Asynchronous Receiver Transmitter) type receiver port of processor 301, and port 312 is a UART type transmission port of processor 301. Advantageously, the first connection pin is the CEC pin and the second connection pin is the reserved pin of the HDMI connector. Such a choice in the connection pins of the HDMI connector 204 to carry out the transmission mode enables a usual operation of television 202 receiving signals from decoder 201, while carrying out diagnosing and/or updating operations of the embedded software of decoder 201.

Passing from the usual operating mode to the transmission mode, and conversely passing from the transmission mode to the usual operating mode, is carried out by a switching operation performed by a switching device 304, controlled by processor 301, that ensures passing from the first connection 321 and second connection 322 of a first position, represented in dotted lines and corresponding to the usual operating mode, to a second position, represented in bold lines and corresponding to the transmission mode. When decoder 201 is placed in transmission mode, a third connection 323, respectively a fourth connection 324, linking in the usual operating mode a port 313, respectively a port 314, of processor 301 to CEC pin 331, respectively to reserved pin 332 of the HDMI connector 204, are disconnected from these said pins.

Figure 4:
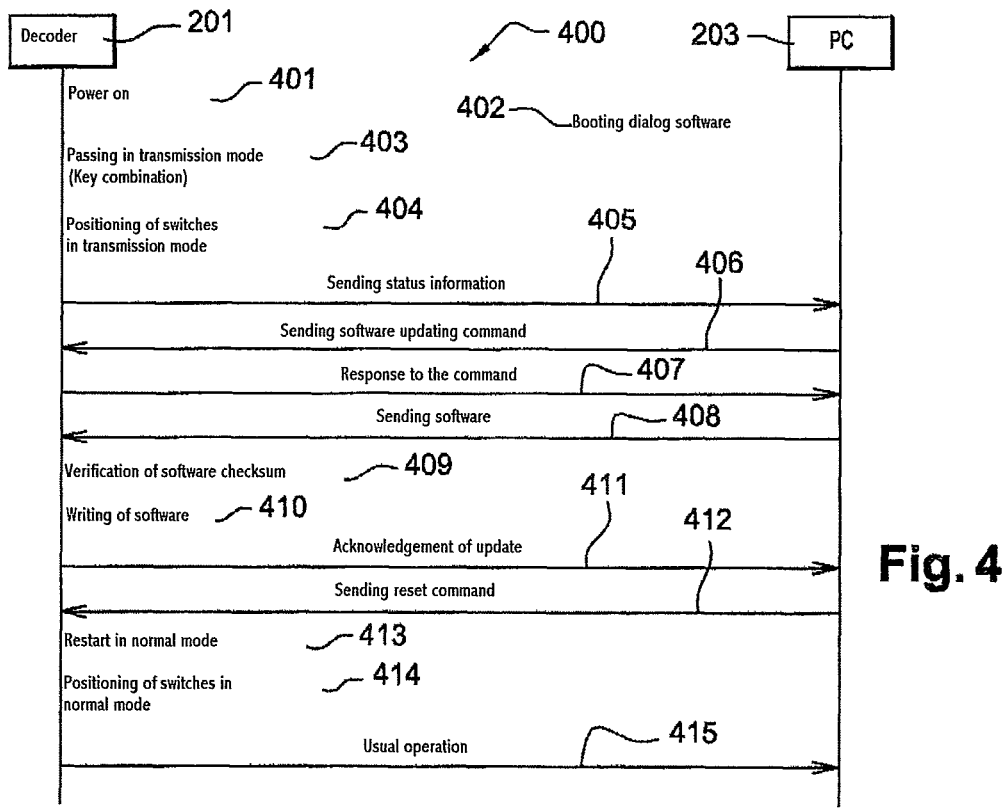
in FIG. 4, an operation diagram during an updating operation of the device according to the invention.

FIG. 4 represents different steps between decoder 201 and personal computer 203, of an operation 400 to update the embedded software 302 according to an example of implementation of the method according to the invention.

Thus, the following different successive steps are represented:

Operation 401 of powering on decoder 201 and booting 402, in the personal computer 203, dialog software between decoder 201 and computer 203;

Passing 403 in the transmission mode following, for example, the receipt of a special command transmitted by a decoder 201 remote control, or following the identification of pressing on one or more of the keys present on decoder 201;

Switching 404 of the switching device 304, resulting in a positioning of switches in a previously described position corresponding to the transmission mode;

Sending 405 from decoder 201 to computer 203 status information indicating to computer 203 the passing in transmission mode;

Sending 406 from computer 203 to decoder 201 an embedded software updating command, initiating updating of the software;

Sending 407 from decoder 201 to computer 203 a response to the previous command, indicating that decoder 201 is ready to receive the entirely updated software;

Sending 408 from computer 203 to decoder 201 the updated software;

Verifying 409, within decoder 201, the integrity of data received, particularly by CRC type calculations;

Writing 410 the updated software in a read-only memory (flash memory, hard disk, etc.) of decoder 201;

Sending 411 from decoder 201 to computer 203 information acknowledging the software updating operation;

Sending 412 from computer 203 to decoder 201 a command to reinitialize decoder 201;

Restarting 413 decoder 201 in usual operating mode;

Toggling the switching device for a repositioning 414 of switches in the position corresponding to the usual operating mode, and resuming the usual operation 415 of decoder 201.

Figure 5:
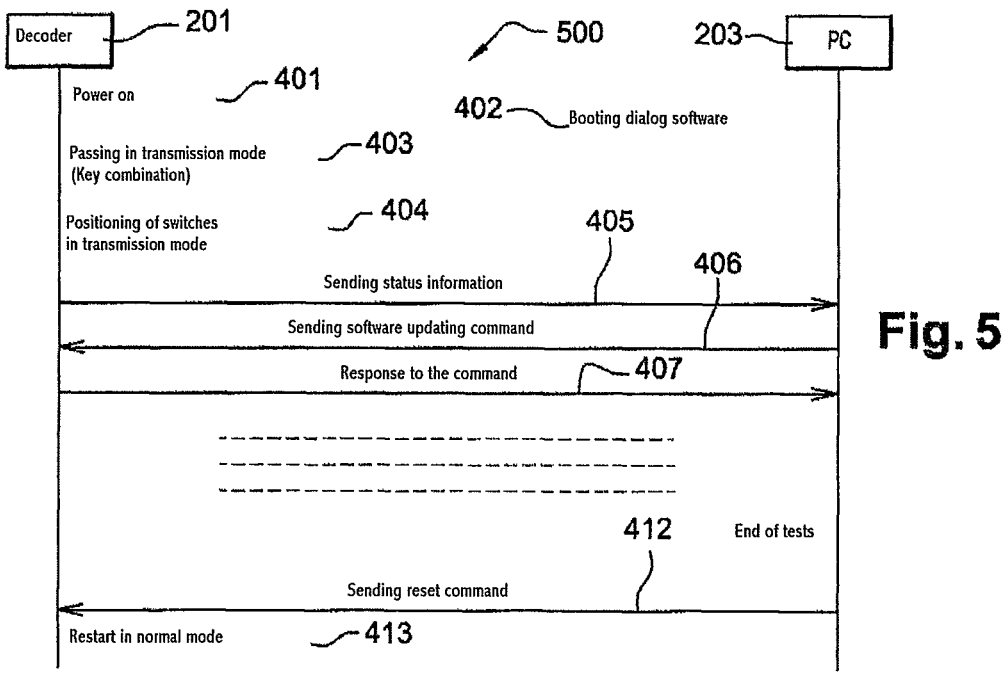
in FIG. 5, an operation diagram during a diagnosing operation of the device according to the invention.

FIG. 5 represents different steps between decoder 201 and personal computer 203, of an operation 500 to diagnose the embedded software 302 according to an example implementation of the method according to the invention.

All of the steps that have just been described are given in the described diagnosing operation, with the exception of steps 408 to 411. In practice, in fact, the software updating operation is a special case of the diagnosing operation, in which a step 406' of sending from computer 203 to decoder 201 a generic command, enabling the operation of the decoder to be tested, replaces the previously mentioned embedded software updating command.

The diagnosing mode particularly enables, within computer 203, knowledge of information relative to the status of decoder 201 (serial number, flash memory locking status, JTAG locking, crypto core activation or non-activation, etc.) to be obtained.

The invention claimed is:

1. A method of diagnosing and/or updating embedded software, associated with a processor of a first electronic device equipped with an HDMI type connector, the method comprising:
   linking, using a suitable cable, a third-party electronic device, configured to perform a diagnosing or updating operation, or both, of the embedded software, with a first pin and a second pin of the HDMI connector;
   carrying out an operation of switching the first electronic device, by toggling said first electronic device from a first mode corresponding to a usual operating mode of the first electronic device, to a second mode corresponding to a transmission mode of the first electronic device, in which the HDMI connector is configured, via the first pin and the second pin, to exchange information to and from the processor, said switching operation comprising different operations comprising
      toggling a first connection, linking in the usual operating mode a first processor port of the processor, dedicated to the receipt of data, to a serial port from of the first electronic device or to an unused port of the first electronic device, such that said first connection links, in the transmission mode, said first port of the processor to said first pin of the HDMI connector;
      toggling a second connection, linking in the usual operating mode a second processor port of the processor, dedicated to the transmission of data, to a serial port from of the first electronic device or to an unused port of the first electronic device, such that said second connection links, in the transmission mode, said second port of the processor to said second pin of the HDMI connector, and
   carrying out, via the suitable cable, exchanges of information between the first electronic device and the third-party electronic device, so as to carry out the operation of diagnosing and/or updating of the embedded software.

2. The method according to claim 1, wherein the first pin of the HDMI connector is the CEC pin, and wherein the second pin of the HDMI connector is the reserved pin.

3. The method according to claim 1, wherein the switching operation is carried out following the receipt by the first electronic device of a specific command, including a command transmitted using a remote control associated with said first electronic device, or a command corresponding to pressing on a key, or on a combination of keys, present on said first electronic device.

4. The method according to claim 1, comprising carrying out an operation of switching the first electronic device by toggling it from the transmission mode to the usual operating mode following the receipt, during the diagnosing or updating operation of the embedded software, of a specific command transmitted by the third-party electronic device via the suitable cable.

5. An electronic device equipped with an HDMI type connector configured to implement the method according to claim 1, said device comprising embedded software associated with a processor, said embedded software being the subject of a diagnosing and/or updating operation, wherein said device comprises a switch to carry out:
   toggling a first connection, linking in a first mode of operation, known as the usual operating mode, a first processor port, dedicated to the receipt of data, to a serial port or to an unused port of said electronic device, such that said first connection links, in a second mode of operation, known as the transmission mode, said first port of the processor to a first pin of the HDMI connector;
   toggling a second connection, linking in the usual operating mode a second processor port, dedicated to the transmission of data, to a serial port or to an unused port from said electronic device, such that said second connection links, in the transmission mode, said second port of the processor to said second pin of the HDMI connector.

6. The device according to claim 5, wherein, in transmission mode, the first processor port is connected to the CEC pin of the HDMI connector, and wherein in transmission mode, the second processor port is connected to the reserved pin of the HDMI connector.

7. The electronic device according to claim 5, wherein the device is of the digital television decoder type.

8. The method according to claim 1, wherein the first electronic device is a decoder of a television.

9. The method according to claim 1, wherein carrying out, via the suitable cable, exchanges of information between the first electronic device and the third-party electronic device includes transmitting by the first electronic device to the third-party electronic device a command status information indicating to the third-party electronic device the passing in the transmission mode.

* * * * *